United States Patent Office 3,499,917
Patented Mar. 10, 1970

3,499,917
PROCESS FOR PREPARING HIGH MOLECULAR CONTENT ESTER OF PROPYLENE GLYCOL
John David Brandner and George Joseph Stockburger, Wilmington, Del., assignors to Atlas Chemical Industries, Inc., Wilmington, Del., a corporation of Delaware
No Drawing. Continuation-in-part of application Ser. No. 454,737, May 10, 1965. This application Nov. 8, 1967, Ser. No. 681,567
Int. Cl. C11c 3/00
U.S. Cl. 260—410.6        10 Claims

ABSTRACT OF THE DISCLOSURE

Process for preparing propylene glycol monoester products whereby the formation of propylene glycol monoester is favored and the formulation of propylene glycol diester, polypropylene glycol, and esters of polypropylene glycol are substantially suppressed. The process comprises reacting propylene oxide with fatty acid in the presence of sufficient amount of potassium hydroxide, potassium salts of weak organic acids, potassium alcohol alhoholates, or mixtures thereof to furnish at least about 1% of KOH equivalent based on the weight of fatty acid, until the acid number decreases to less than about 10, venting the unreacted propylene oxide and neutralizing the catalyst before the acid number has decreased to less than about 1 with an acid that forms a potassium salt which is insoluble in the reaction product, and separating the potassium salt from the reaction product. For high monoester content, the temperature used will desirably depend upon the propylene oxide pressure used. The temperature is from about 100° C. to about 160° C. at oxide pressures of at least 2 atmospheres, and the temperature is from about 100° C. to 147° C. at oxide pressures of less than 2 atmospheres. The novel product is a complex mixture comprising propylene glycol monoester, propylene glycol diester, polypropylene glycol, and esters of polypropylene glycol. The product is suitable for use as a food emulsifier.

---

This application is a continuation-in-part of application Ser. No. 454,737, filed May 10, 1965, now abandoned.

This invention relates to a process for the preparation of esters of fatty acids and, more particularly, to an improved process for preparing propylene glycol monoesters of fatty acids suitable for use in foods.

It is known that propylene glycol monoesters of fatty acids can be prepared by reacting fatty acid with propylene oxide in the presence of a reaction promoter, such as sodium hydroxide or sulfuric acid. The use of such promoters has not been completely satisfactory because they also promote undesirable side reactions, such as the formation of propylene glycol diesters, polypropylene glycol, and esters of polypropylene glycol. It would be highly desirable to provide a simple, economical, and efficient method for preparing propylene glycol monoesters of fatty acids suitable for use in foods whereby upwards to 90% of the reactants may be converted into the desired propylene glycol monoester product while the formation of propylene glycol diester, polypropylene glycol, and esters of polypropylene glycol are substantially suppressed.

Accordingly, it is an object of the present invention to provide a novel and improved process for preparing propylene glycol esters of fatty acids.

Another object is to increase the proportion of propylene glycol monoester relative to the propylene glycol diester produced in the esterification of fatty acid with propylene glycol.

Another object is to minimize the formation of polypropylene glycol.

Another object is to minimize the formation of esters of polypropylene glycol.

Another object is to minimize the formation of free propylene glycol.

Another object is the preparation of propylene glycol monoester product suitable for use in foods.

A further object is the preparation of propylene glycol monoester product for use as food emulsifiers.

A further object is the preparation of propylene glycol monoester product suitable for the preparation of clear liquid shortenings.

Another object is to provide a simple, economical, efficient, and commercially attractive process for preparing propylene glycol monoester by the reaction of propylene oxide with fatty acid.

Other objects and advantages of this invention will further become apparent in the following description and in the appended claims.

These objects are accomplished in accordance with the present invention by reacting propylene oxide with fatty acids in the presence of sufficient amount of a catalyst selected from the group consisting of potassium hydroxide, potassium salts of weak organic acids, potassium alcoholates, and mixtures thereof to furnish at least about 1% of KOH equivalent based on the weight of the fatty acid, at temperatures between about 100° C. and about 160° C. until the acid number decreases to less than about 10, venting the unreacted propylene oxide and neutralizing the catalyst before the acid number has decreased to less than about 1 with an acid that forms a potassium salt which is insoluble in the reaction product, and separating the potassium salt from the propylene glycol monoester of the fatty acid.

Fatty acids which may be used in the process of the present invention are those monobasic fatty acids containing from 10 to 22 carbon atoms. The monobasic fatty acids which may be used include straight chain, branched chain, saturated, and unsaturated acids. Representative fatty acids include capric acid, lauric acid, tridecanoic acid, myristic acid, pentadecanoic acid, palmitic acid, margaric acid, stearic acid, oleic acid, linoleic acid, nondecylic acid, arachidic acid, behenic acid, oleic acid, elaidic acid, linoleic acid, and the like. Mixtures of monobasic carboxylic acids may also be used. The preferred monobasic carboxylic acids are those containing 12 to 18 carbon aotms. The most preferred acids are palmitic acid, stearic acid, and mixtures of palmitic acid and stearic acid.

It is important that the reaction be terminated before the fatty acid is completely reacted with propylene oxide. If the reaction is carried too far the yield of propylene glycol monoester will decrease and higher yields of diester and free glycol will be obtained. The highest yields of monoester will be obtained if the reaction is terminated when the acid number has decreased to within the range of 1 to 10, preferably 2 to 5.

The propylene oxide is preferably added to a mixture of fatty and catalyst which has been preheated to reaction temperatures since it is desirable to minimize the time the reaction mixture is exposed to elevated temperatures. Prolonged heating with or without excess oxide will result in an unfavorable product distribution. Furthermore, at reaction temperatures, it is necessary to add the oxide gradually. If the entire epoxide charge is added in one fell-swoop, it may be impossible to control the reaction conditions and, because of its highly exothermic nature, an explosive reaction may ensue. The propylene oxide should be added at such a rate that unreacted alkylene oxide is always present. The propylene oxide is usually added to the reaction mixture under pressure. While propylene oxide and fatty acid may be reacted at pressures in the range of from about 1 to about 10 atmospheres, pressures moderately above atmospheric pressure, in the range of from about 2 to 5 atmospheres, are preferred.

The reaction temperature should be maintained between about 100° C. and about 160° C. Temperatures below 100° C. result in very slow reactions which tend to make the process uneconomical. Temperatures above 160° C. tend to cause undesirable side reactions. The preferred temperature is about 115° C. to about 130° C.

For high monoester content, the temperature used in the process of this invention will desirably depend upon the propylene oxide pressure used. If the propylene oxide pressure is at least 2 atmospheres say from 2 to 10 atmospheres, the temperature may range from about 100° C. to about 160° C. and preferably from about 115° C. to about 130° C. However, if a propylene oxide pressure of less than two atmospheres is used the temperature is maintained in the range of about 100° C. to 147° C. and preferably from about 115° C. to about 130° C. The mol ratio of monoester to diester in the reaction product decreases rapidly when the temperature is above 147° C. and the pressure is below 2 atmospheres.

The amount of propylene oxide charged is controlled by two conflicting considerations. Large amounts of propylene oxide drives the reaction to completion. However, any substantial amounts of unreacted propylene oxide must be recovered for economical reasons. Hence, it is desirable to keep the amount of propylene oxide low so that any unreacted propylene oxide may be vented to the atmosphere without substantial economic loss, and, at the same time, to use sufficient amounts of propylene oxide to yield favorable product distribution. Such results can be obtained by using 1.0 to 1.2 molar proportions of propylene oxide to one molar proportion of free fatty acid. It being understood that larger amounts of propylene oxide can be used if one is not concerned with the loss of unreacted propylene oxide or the expense of recovery.

The amounts of dipropylene glycol and tripropylene glycol (free and/or esterified) formed are highly dependent on the nature and concentration of the catalyst. The preferred catalyst is potassium hydroxide, however, potassium alcoholates and potassium salts of weak organic acid, such as potassium methylate, potassium acetate, potassium stearate, potassium carbonate, and the like can also be used. The amount of catalyst should be at least about 1.0% (KOH equivalent), preferably about 1.5%; weight percent of the fatty acid charged. The dipropylene glycol and tripropylene glycol content decreases with increasing catalyst concentration up to a catalyst concentration of about 1.5%. Undesirably large amounts of soap are present in the reaction product when the catalyst concentration is above about 2% by weight of the initial fatty acid-catalyst charge.

When the reaction mass has the desired acid number, the excess propylene oxide is vented and the catalyst neutralized with an acid that will form a potassium salt which is insoluble in the reaction product, such as mineral acid or an aqueous solution of an organic acid, such as citric acid. The preferred acid is phosphoric acid ($H_3PO_4$). The amount of acid should be at least 65 mol percent, preferably 90–100 mol percent of the catalyst charged.

Neutralization of the catalyst with acid precipitates the potassium salt of the acid. The precipitated salt can be removed by any suitable means, such as by filtration. Diatomaceous earth may be added to facilitate the filtration.

The following examples will illustrate the manner in which the invention may be practiced, but it is to be understood that such details are given merely for exemplification purposes and are not to be construed as limiting the scope of the appended claims.

EXAMPLE 1

A 50 gallon autoclave was charged with 200 lbs. of double pressed stearic acid (Industrene 4516) and 1513 g. of flake potassium hydroxide (90% assay). The mixture was heated to 120° C. and full vacuum pulled on the autoclave for ½ hour. The vacuum was released and 42.5 lbs. of propylene oxide was added while maintaining the temperature at 120° C. The maximum pressure developed was 50 p.s.i.g. The excess propylene oxide was vented when the acid number had decreased to 2.0. The reaction mixture was treated with 2700 g. of 85% $H_3PO_4$, 350 g. of activated carbon, (S–51 Darco) transferred to a spray deodorizer, and deodorized for 30 minutes at 80° C. and 10 mm. pressure. 100 g. of diatomaceous earth (Hyflo Super Cel) was added and the mixture filtered. The product contained 87% monoester, 3% diester, and 0.4% free propylene glycol. Hydrolysis of 100 grams of the product yielded 0.2 gram of dipropylene glycol and 0.01 gram of tripropylene glycol.

EXAMPLE 2

4000 grams of Hystrene 9022 fatty acid (70% arachidic and behenic acids) and 66.6 grams of potassium hydroxide were charged to a two gallon autoclave, heated to 120° C. and full vacuum pulled on the autoclave for 30 minutes. The vacuum was released and 680 grams of propylene oxide charged to the autoclave at 50 p.s.i.g. pressure while maintaining the temperature at 120° C. The excess propylene oxide was vented to the atmosphere when the acid number had decreased to about 4. The reaction mixture was treated with 130 grams of 85% $H_3PO_4$ and 25 grams of activated carbon (S–51 Darco), transferred to a spray deodorizer, and deodorized for 30 minutes at 80° C. and 10 mm. pressure, and the mixture filtered. The product contained 83% monoester, 5% diester, 11.6% free fatty acid, and 0.62% free propylene glycol. Hydrolysis of 100 grams of the product yielded 0.26 gram of dipropylene glycol and 0.02 gram of tripropylene glycol.

EXAMPLE 3

Example 2 was repeated except that 4000 grams of Emerys 233LL fatty acid (87% oleic acid, 4% linoleic acid, 3% myristic acid, and 6% palmitic acid) and 820 grams of propylene oxide were employed. The resulting product contained 87% monoester, 4% diester, 8.5% free fatty acid, and 0.66% free propylene glycol. Hydrolysis of 100 grams of the product yielded 0.36 gram of dipropylene glycol and 0.03 gram of tripropylene glycol.

EXAMPLE 4

Example 2 was repeated except that 4000 grams of Hystrene 9016 fatty acid (92% palmitic acid) and 900 grams of propylene oxide were employed. The resulting product contained 89% monoester, 3% diester, 7.3% free fatty acid, and 0.61% free propylene glycol. Hydrolysis of 100 grams of the product yielded 0.39 gram of dipropylene glycol and 0.02 gram of tripropylene glycol.

EXAMPLE 5

Example 2 was repeated except that 4000 grams of Hystrene 9014 fatty acid (90% myristic acid) and 1000 grams of propylene oxide were employed. The reaction product contained 89% monoester, 3% diester, 7.9% free fatty acid, and 0.42% free propylene glycol. Hydrolysis of 100 grams of the product yielded 0.39 grams of dipropylene glycol and 0.02 grams of tripropylene glycol.

EXAMPLE 6

Example 2 was repeated except that 4000 grams of Hystrene 9012 fatty acid (92% lauric acid) and 1160 grams of propylene oxide were employed. The reaction product contained 89% monoester, 4% diester, 6.1% free fatty acid, and 0.61% free propylene glycol. Hydrolysis of 100 grams of the product yielded 0.58 gram of dipropylene glycol and 0.03 gram of tripropylene glycol.

EXAMPLE 7

200 lbs. of Industrene 4516 fatty acid (double pressed stearic acid) and 1513 grams of potassium hydroxide were charged to a 50 gallon autoclave, heated to 120° C., and full vacuum pulled on the autoclave for 30 minutes. The vacuum was released and 42.5 lbs. of propylene oxide charged to the autoclave at 50 p.s.i.g. of pressure while maintaining the temperature at 120° C. The excess propylene oxide was vented to the atmosphere when the acid number had decreased to 5. The reaction mixture was transferred to a spray deodorizer and deodorized for 30 minutes at 120° C. and 10 mm. or less of pressure. The deodorized product was treated with 2700 grams of 85% $H_3PO_4$ and 350 grams of S-51 Darco activated carbon for 30 minutes at 120° C. 100 grams of diatomaceous earth (Hyflo Super Cel) was added and the mixture filtered. The product contained 86% monoester, 5% diester, and 0.43% free propylene glycol. Hydrolysis of 100 grams of the product yielded 0.29 gram of dipropylene glycol and 0.01 gram of tripropylene glycol.

EXAMPLE 8

Example 5 was repeated except that the propylene oxide was vented to the atmosphere when the acid number had decreased to 2.2 and only 2600 grams of 85% $H_3PO_4$ was used to neutralize the catalyst. The final product contained 85% monoester, 7% diester, 0.44% soap, and 0.57% free propylene glycol. Hydrolysis of 100 grams of the product yielded 0.54 gram of dipropylene glycol and 0.01 gram of tripropylene glycol.

EXAMPLE 9

Example 7 was repeated except that the reaction was stopped when the acid number had decreased to 2.0. The final product contained 86% monoester, 7% diester, and 0.64% free propylene glycol. Hydrolysis of 100 grams of the product yielded 0.34 gram of dipropylene glycol and 0.01 gram of tripropylene glycol.

EXAMPLE 10

Example 7 was repeated except that 42 lbs. of propylene oxide was added in increments and the reaction was stopped when the acid number had decreased to 2.03. The final product contained 84% propylene glycol monoester and 9% propylene glycol diester.

EXAMPLE 11

Example 7 was repeated except that the reaction was stopped when the acid number had decreated to 4.95 and only 2650 grams of 85% $H_3PO_4$ was used. The final product contained 87% propylene glycol monoester and 4% propylene glycol diester.

EXAMPLE 12

Example 7 was repeated except that 200 lbs. of Hystrene S-9718 fatty acid (97% stearic acid) and only 39.5 lbs. of propylene oxide were used and the reaction was stopped when the acid number had decreased to 3.65. The final product contained 87% propylene glycol monoester and 5% propylene glycol diester.

EXAMPLE 13

A mixture of 545 grams Industrene 254 fatty acid (50–54% stearic acid and 40–44% palmitic acid) and 49.5 grams of potassium oleate were heated to 125° C. and vacuum stripped at 0.5 mm. for two hours. 555 grams of the mixture was charged to a one-liter autoclave and heated to 100° C. The autoclave was vented to 5 p.s.i.g. and 178 grams of propylene oxide charged over a forty-minute period. The charge was heated for an additional 175 minutes, and a 205 gram sample removed from the autoclave. The sample was vacuum stripped at 70–80° C. and 1 mm. of pressure for 0.5 hour, treated with 2% Darco KB activated carbon at 60–70° C. for 0.5 hour, and filtered through a Pyrex M filter funnel. The filtrate had an acid number of 3.2 and analyzed as 92.0% propylene glycol monoester, 2.6% propylene glycol diester, 0.12% free propylene glycol, 3.7% soap, and 1.6% free fatty acid. The soap content is reduced by the addition of phosphoric acid to form the insoluble potassium phosphate which is removed by filtration.

EXAMPLE 14

A two gallon autoclave is charged with 4000 grams of double pressed stearic acid and 70 grams of potassium methylate. The mixture is heated to 130° C. and 680 grams of propylene oxide charged to the autoclave. The unreacted propylene oxide is vented to the atmosphere when the acid number has decreased to about 2. The reaction mixture is treated with 36 grams of HCl and 25 grams of S-51 Darco activated carbon and vacuum stripped for 30 minutes at 75° C. and 5 mm. pressure. The precipitated potassium chloride is removed from the propylene glycol monoester by filtration.

EXAMPLE 15

200 lbs. of Industrene 4516 fatty acid (double pressed stearic acid) and 1513 grams of potassium hydroxide were charged to a 50 gallon autoclave and heated to 120° C. 41 lbs. of propylene oxide was added to the autoclave under 50 p.s.i.g. of pressure. Unreacted propylene oxide was vented to the atmosphere when the acid number had decreased to 2.55. The reaction mixture was transferred to a spray deodorizer and deodorized for 30 minutes at 120° C. The deodorized mixture was treated with 2700 grams of 85% $H_3PO_4$ and 350 grams of S-51 Darco activated carbon and heated to 120° C. for 30 minutes. 100 grams of diatomaceous earth (Hyflo Super Cel) was added and the mixture filtered. The resulting product contained 86% monoester, 6% diester, 0.40% soap, and 0.75% free propylene glycol. Hydrolysis of 100 grams of the product yielded 0.3 gram of dipropylene glycol and 0.01 gram of tripropylene glycol.

In the following example, the catalyst is partially neutralized before the desired acid number is reached, the reaction continued until the desired acid number is reached, and then the reaction terminated by neutralizing the rest of the catalyst.

EXAMPLE 16

495 grams Industrene 254 fatty acid (50–54% stearic acid and 40–44% palmitic acid), 20 grams Emersol 233LL fatty acid (87% oleic acid) and 8.9 grams powdered potassium hydroxide (85% assay) were charged to a 1 liter stirred autoclave, flushed with nitrogen and heated to 120° C. The autoclave was vented to 5 p.s.i.g. of pressure, 100 grams propylene oxide added, and the charge reacted until an acid number of 11 was obtained. The charge was cooled, 9 grams of 85% $H_3PO_4$ added, and agitated for 15 minutes at 70–90° C. The acid number increased to 23. The reactor was flushed with nitrogen, reheated to 120° C., vented to 5 p.s.i.g. of pressure, 25 grams of propylene oxide added, and reacted to an acid number of 1.4. The charge was cooled to 92° C., agitated with 3.2 grams of 85% $H_3PO_4$ for 15 minutes and removed from the reactor. The product was vacuum stripped at 70° C. and 1 mm. of pressure for 30 minutes, treated with 10.8 grams of Darco KB activated carbon at 60–80° C. for 30 minutes, and filtered. The product contained 89.9% monoester, 5.4% diester, 2.9% free fatty acid, 0.98% free propylene glycol, and 0.86% soap. Hydrolysis of 100 grams of product yielded 0.38 gram of dipropylene glycol and 0.03 grams of tripropylene glycol.

EXAMPLE 17

500 grams of Emersol 233LL fatty acid (87% oleic acid, 4% linoleic acid, 3% myristic acid, and 6% palmitic acid) and 7.6 grams of potassium hydroxide were charged to a one liter autoclave, flushed with nitrogen, and heated to 130° C. The autoclave was vented to 5 p.s.i. gauge pressure, i.e. 19.7 p.s.i. of pressure absolute and propylene oxide charged to the autoclave until the oxide pressure reached 31 p.s.i. absolute. The temperature and oxide pressure were maintained until the acid number reached 6.2. The unreacted propylene oxide was vented to the atmosphere, the reaction mixture neutralized with phosphoric acid, and deodorized for 30 minutes at 70° C. and 1 mm. pressure. The product contained 83.9% monoester, 4.98% diester, 9.89% free fatty acid, and 0.78% free propylene glycol. The mol ratio of monoester to diester was 29.9.

EXAMPLE 18

488 grams of Emersol 132 fatty acid (53% palmitic acid, 42% stearic acid, 2.5% myristic acid, 2% margaric acid and 0.5% pentadecanoic acid) and 5.9 grams of potassium hydroxide were charged to a one liter autoclave, heated to 147° C., and full vacuum pulled on the autoclave. The vacuum was released with propylene oxide, and propylene oxide was charged to the autoclave until the oxide pressure reached 30 p.s.i. absolute. The temperature was maintained at 147° C. and the oxide pressure at 30 p.s.i. absolute. The unreacted propylene oxide was vented to the atmosphere when the acid number had decreased to about 8.6. The reaction mixture was neutralized with phosphoric acid, deodorized for 30 minutes at 70° C. and 1 mm. pressure, and then filtered. The product contained 84.1% monoester, 4.83% diester, 8.59% free fatty acid, and 0.33% free propylene glycol. The mol ratio of monoester to diester was 30.8.

EXAMPLE 19

Example 18 was repeated except that the reaction temperature was 155° C. and the acid number was 7.4. The reaction product contained 84.5% monoester, 6.87% diester, 7.86% free fatty acid, and 0.54% free propylene glycol. The mole ratio of monoester to diester was 21.7.

EXAMPLE 20

Example 18 was repeated except that the temperature was 147° C., the oxide pressure was 14.7 p.s.i., and the acid number was 4.9. The reaction product contained 79.3% monoester, 13.2% diester, 6.41% free fatty acid, and 0.87% free propylene glycol. The mol ratio of monoester to diester was 10.6.

EXAMPLE 21

Example 18 was repeated except that the reaction temperature was 140° C., the oxide pressure was 14.7 p.s.i., and the acid number was 9.7. The reaction product contained 75.9% monoester, 10.2% diester, 13.2% free fatty acid, and 0.45% free propylene glycol. The mol ratio of monoester to diester was 13.2.

Example 21 was repeated except that the temperature was 155° C. and the acid number was 9.2. The product contained 65.9% monoester, 23.2% diester, 9.54% free fatty acid, and 1.31% free propylene glycol. The mol ratio of monoester to diester was 5.02.

The above examples and description are to be taken as only illustrative of the invention and a number of its preferred embodiments and it is to be understood that many further variations and modifications of the invention may be made by those skilled in the art without departing from the scope and spirit of the invention which is defined in the appended claims.

Having thus described the invention, what is desired to be secured by Letters Patent is:

1. A process for the preparation of propylene glycol monoester product which comprises reacting propylene oxide with fatty acid in the presence of sufficient amount of a catalyst selected from the group consisting of potassium hydroxide, potassium salts of weak organic acids, potassium alcoholates, and mixtures thereof, to furnish at least about 1.0% of potassium hydroxide equivalent based on the weight of fatty acid, at a temperature in the range of from about 100° C. to about 160° C. and a propylene oxide pressure in the range of from about 2 atmospheres to about 10 atmospheres, until the acid number has decreased to below about 10, venting unreacted propylene oxide and neutralizing the catalyst before the acid number has decreased to below about 1 with an acid that forms a potassium salt which is insoluble in the reaction product, and separating the formed potassium salt from the formed propylene glycol monoester.

2. The product prepared by the process of claim 1.

3. The process of claim 1 wherein the propylene oxide pressure is from about 2 atmospheres to about 5 atmospheres.

4. A process for the preparation of propylene glycol monoester product which comprises adding propylene oxide in excess of the stoichiometric amount, based on the amount of free fatty acid, at a pressure of from about 2 atmospheres to about 10 atmospheres, to a mixture of fatty acid containing 10–22 carbon atoms and a catalyst selected from the group consisting of potassium hydroxide, potassium salts of weak organic acids, potassium alcoholates and mixtures thereof, said mixture having been preheated to a temperature in the range of from about 100° C. to about 160° C. and containing sufficient amount of said catalyst to furnish at least about 1.0% of potassium hydroxide equivalent based on the weight of fatty acid, maintaining the temperature in the range of from about 100° C. to about 160° C. and the pressure in the range of from about 2 atmospheres to about 10 atmospheres and reacting the resulting mixture until the acid number has decreased to below about 10, venting unreacted propylene oxide and neutralizing the catalyst before the acid number has decreased to below about 1 with an acid that forms a potassium salt which is insoluble in the reaction product, and separating the formed potassium salt from the formed propylene glycol monoester.

5. A process for preparing propylene glycol monoester product which comprises adding 1.0 to 1.2 mols of propylene oxide, based on the amount of free fatty acid, at a pressure of from about 2 atmospheres to about 5 atmospheres to a mixture of fatty acid containing 12–18 carbon atoms and potassium hydroxide, said mixture containing about 1.5% of potassium hydroxide based on the weight of fatty acid, and which mixture has been preheated to a temperature between about 115° C. and about 130° C., maintaining the temperature between about 115° C. and about 130° C. and the propylene oxide pressure in the range of from about 2 atmospheres to about 5 atmospheres and reacting the resulting mixture until the acid number has decreased to below about 5, venting the unreacted propylene oxide and neutralizing the potassium hydroxide before the acid number has decreased to below about 2 with an acid that forms a potassium salt which is insoluble in the reaction product, and separating the potassium salt from the propylene glycol monoester.

6. The product prepared by the process of claim 5.

7. A process for the preparation of propylene glycol monostearate product which comprises adding 1.0 to 1.2 mols of propylene oxide, per mol of free fatty acid, at a pressure of from about 2 atmospheres to about 5 atmospheres to a mixture of stearic acid and potassium hydroxide containing about 1.5% of potassium hydroxide based on the weight of fatty acid, and which mixture has been preheated to about 120° C., maintaining the temperature at about 120° C. and the propylene oxide pressure in the range of from about 2 atmosphere to about 5 atmospheres and reacting the resulting mixture until the acid number has decreased to below about 5, venting the excess propylene oxide and completely neutralizing the potassium hydroxide with phosphoric acid before the acid number has decreased to below about 1, and separating the potassium salt from the propylene glycol monostearate.

8. The product prepared by the process of claim 7.

9. A process for the preparation of propylene glycol monoester product which comprises reacting propylene oxide with fatty acid in the presence of sufficient amount of a catalyst selected from the group consisting of potassium hydroxide, potassium salts of weak organic acids, potassium alcoholates, and mixtures thereof, to furnish at least about 1.0% of potassium hydroxide equivalent based on the weight of fatty acid, at a temperature in the range of from about 100° C. to 147° C. and a pressure in the range of from about 1 atmosphere to about 10 atmospheres, until the acid number has decreased to below about 10, venting unreacted propylene oxide and neutralizing the catalyst before the acid number has decreased to below about 1 with an acid that forms a potassium salt which is insoluble in the reaction product, and separating the formed potassium salt from the formed propylene glycol monoester.

10. The process of claim 9 wherein propylene oxide in excess of the stoichiometric amount is used, the amount of catalyst is at least about 1.5%, and the temperature is from 115° C. to 130° C.

References Cited

Wrigley et al., J. American Oil Chemists' Soc., 34, 39 (January 1957).

Wrigley et al., J. American Oil Chemists' Soc. 36, 34 (January 1959).

LORRAINE A. WEINBERGER, Primary Examiner

R. S. WEISSBERG, Assistant Examiner

U.S. Cl. X.R.

99—118

PO-1050
(5/69)

UNITED STATES PATENT OFFICE
CERTIFICATE OF CORRECTION

Patent No. 3,499,917          Dated March 10, 1970

Inventor(s) John David Brandner and George Joseph Stockburger

It is certified that error appears in the above-identified patent and that said Letters Patent are hereby corrected as shown below:

Column 1, line 1 of title reading "MOLECULAR" should read --MONOESTER--. Column 1, line 3 of the abstract reading "formulation" should read --formation--. Column 1, line 8 of the abstract reads "alhoholates" should read --alcoholates--. Column 2, line 48, reading "aotms" should read --atoms--. Column 2, line 61, after "fatty" insert --acid--. Column 4, line 18, reading "0.2 gram" should read --0.27 gram--. Column 5, line 52, reading "decreated" should read --decreased--.

Signed and sealed this 30th day of November 1971.

(SEAL)
Attest:

EDWARD M. FLETCHER, JR.
Attesting Officer

ROBERT GOTTSCHALK
Acting Commissioner of Patents